2,944,035
Patented July 5, 1960

2,944,035
AROMATIC EPOXIDIZED POLYESTER AND METHOD OF MAKING

Robert L. Wear, West St. Paul, Minn., assignor to Minnesota Mining & Manufacturing Company, St. Paul, Minn., a corporation of Delaware No Drawing. Filed July 20, 1955, Ser. No. 523,367

9 Claims. (Cl. 260—18)

This invention relates to a novel class of epoxy polyester resins which can be cured to infusible, insoluble products; to resinous compositions incorporating hardening agents with the novel epoxy resins; and to the cured resinous products obtained therefrom. More specifically, the invention is concerned with a class of epoxy polyester resins, each member of which may be characterized as an aryloxy derivative of a polyepoxidized polyester of polyhydric aliphatic alcohol and long-chain aliphatic monocarboxylic acid, and with methods of making and using this class of phenol-substituted epoxy polyester resins.

Typical prior art epoxy resins are those which are produced by the reaction of one or more moles of epichlorhydrin or glycerol dichlorhydrin with a mole of bisphenol A in the presence of a base such as sodium hydroxide and at elevated temperatures within the approximate range of 50°–150° C. The resinous glycidyl polyether obtained from epichlorhydrin and bisphenol A is a complex mixture rather than a single chemical compound, which has been represented by the following general formula:

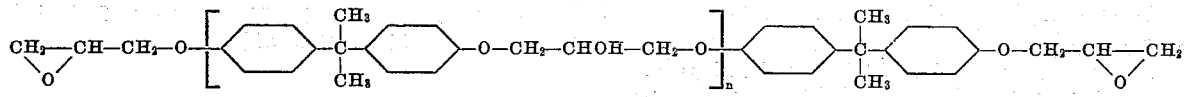

where $n$ has an average value between zero and about seven, depending for the most part on the relative proportions of bisphenol A and epichlorhydrin in the initial reaction mixture. A number of these epoxy polyether resins are commercially available such as the Epon resins of the Shell Chemical Corporation, the Araldite resins of the Ciba Company and certain Bakelite resins of the Union Carbide and Carbon Corporation. These polyether resins vary from the liquid state at ordinary room temperatures, for which $n$ in the above formula approaches 0, to high molecular weight solids having melting points well above 100° C.

Other polyhydric phenols, e.g. resorcinol or 2,2-bis-(4-hydroxyphenyl)butane, as well as various tris-phenols, may be substituted for the bisphenol A.

Other polyhydroxy compounds such as glycol or glycerol may be reacted with epichlorhydrin in the presence of boron trifluoride catalyst and the product converted with certain alkaline reagents to the liquid or resinuous glycidyl polyether, having utility in the practice of this invention.

The chlorhydrin component likewise may be replaced by other compounds serving as equivalent reactive sources of epoxy radicals.

In all cases, the epoxy resin contains an average of more than one epoxy group,

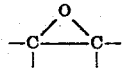

also called the oxirane group, per average molecular weight.

A variety of other liquid or resinous epoxy-containing materials in which the average number of epoxy linkages per average molecular weight exceeds one have been produced, some of which are curable to infusible, insoluble products in admixture with suitable hardening agents and so may be classed as epoxy resins and others of which either cannot be cured or cured to a cheesy or to a flaccid state. Certain of the latter group of epoxy-containing compounds are useful in admixture with other epoxy resins in that they impart flexibility or some other beneficial property to the cured resinous products or reduce the cost per pound without materially depreciating the value of the cured products. For example, the reaction products of certain unsaturated oils such as soybean oil with hydrogen peroxide and formic acid or other epoxide-creating substances have been combined with epoxy polyether resins obtained by the reaction of epichlorhydrin and bisphenol A in the production of a variety of useful resinous articles. However, epoxidized soybean oil cannot in simple combination with cross-linking agents or other hardening materials be converted to a serviceable state.

Epoxy resins as described are by themselves permanently thermoplastic and ordinarily require the addition of cross-linking agents or other reactive materials before they can be cured to hard, infusible resinous products. The chemical hardening agents may react with the epoxy resins at their epoxy groups or the reaction may involve the hydroxyl groups, or both. A number of chemical hardening agents for epoxy resin are known including organic acid anhydrides such as maleic, pyromellitic, phthalic or hexahydrophthalic anhydride; amines, such as diethylamine or diethylene triamine; and other agents including di-isocyanates, urea-formaldehyde resins, dicyandiamide, glyoxal, aromatic polysulfonic acids, etc. Because the reaction between the epoxy resin and the hardening agent may proceed rather slowly, small amounts of activators are sometimes included in the reactive composition, for example, alkali phenoxides, Friedel-Crafts type catalysts, and various amines, particularly tertiary amines.

The chemical hardening agents are generally used in amounts stoichiometrically equivalent to the free epoxy groups in the epoxy resin. However considerable variation in proportions is generally permissible with very little observable difference in quality in the cured products, particularly where considerable amounts of modifiers are incorporated into the compositions. The preferred range of proportions in a particular case may be the result of compromising certain features of the cured products.

This invention deals with a novel class of phenol-substituted polyester resins which may be produced by chemically reacting in an alkaline medium a polyepoxidized animal or vegetable oil or the like with an aromatic compound having at least one phenolic hydroxyl group. The reaction proceeds between a phenolic hydroxyl group and an epoxy or oxirane group in the following manner, using phenol as an example:

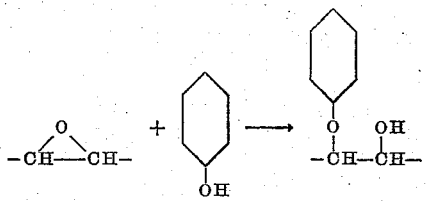

If more than the one hydroxyl group or if some other functional group is present on the aromatic ring, each can react with separate epoxy groups. However, after one hydroxyl group of a polyhydric phenol reacts, the other groups are rendered much less reactive and to a large extent remain unreacted after completion of a moderate heating cycle.

A variety of polyepoxidized polyesters, both natural and synthetic, are useful in the practice of this invention. Among others, suitable polyepoxides of the following natural oils have been produced: cottonseed oil, corn oil, lard oil, soybean oil, rapeseed oil, linseed oil, castor oil, and peanut oil. The natural oils are largely comprised of mixed triglycerides of unsaturated fatty acids of 18 carbon atoms. In most oils, a small proportion of the fatty acid hydrocarbon chains are saturated, many are mono-olefinic, others are poly-olefinic and some of the fatty acid chains contain conjugate double bonds. In fact, a considerable proportion of the double bonds may be conjugated as in linseed oil.

By the same token, considerable latitude is permissible in the selection of synthetic substitutes for the natural oils. For example, useful polyepoxides may be prepared from diglycerides of unsaturated, long-chain fatty acids, triglycerides of two unsaturated and one saturated long-chain fatty acids, and polyesters of polyhydric aliphatic alcohols having more than three esterfiable alcohol radicals such as pentaerithritol. In each case the polyester must contain at least two long-chain, olefinically unsaturated fatty acid residues. Because of their inherently higher cost, polyepoxides of synthetic polyesters are not considered to have much commercial significance although they might be commercially useful in minor proportion with the polyepoxide of a natural polyester. Particularly preferred in the practice of this invention because of its very low cost is epoxidized soybean oil.

The polyepoxidation of naturally occurring unsaturated triglycerides as well as of other polyesters of polyhydric aliphatic alcohols and long-chain aliphatic monocarboxylic acids, which polyesters include at least two unsaturated, long-chain fatty acid residues in the polyester molecule, is well known as are methods for controlling the degree of epoxidation. In the practice of this invention, it is preferred that the epoxidation be carried to the extent that at least about three epoxy groups are present per average molecular weight although considerable variation in the degree of epoxidation is permissible, and indeed, some suitable triglycerides cannot be epoxidized to this degree.

A wide variety of aromatic compounds having at least one phenolic hydroxyl radical are suitable for use as reactants with the polyepoxidized polyesters to produce epoxy resins, for example: resorcinol, hydroquinone, phenol, naphthol, salicylic acid, p-phenyl phenol, cardanol, p-tertiary butyl phenol, and 2,2-bis(4-hydroxyphenyl)-propane which is known in commerce as bisphenol A.

In reacting the polyepoxidized polyesters with a phenolic compound in the production of the novel epoxy resins of this invention, it is important that the proportion of the phenol, or the extent of the reaction, or both, be controlled so that sufficient epoxy groups remain in the reaction product to allow it to be cross-linked to the insoluble, infusible state. That is, the reaction product preferably contains at least about one oxirane group per average molecular weight. However, it is not the mere presence of a plurality of epoxy groups per average molecular weight that allows the production of insoluble, infusible products, for as has been pointed out above, polyepoxidized oils such as epoxidized soybean oil cannot be cured with hardening agents for epoxy resin to useful, thermoset products. Accordingly, it is also preferred that the phenolic compound be present in sufficient proportions and the reaction be carried out to the extent that on the average at least about one-half aryloxy radical be present per average molecular weight. It should be noted that the hydroxyl groups created in the rupture of the oxirane groups may enter into reaction with the chemical hardening agent as may free hydroxyl or other reactive groups on the phenolic residue so that considerable variation is allowable in the number of unreacted epoxy groups remaining in the aryloxy derivative of the polyepoxidized oil, largely depending on the hardening agent to be used in its cure and the desired conditions of cure.

The novel phenol-substituted epoxy polyester resins of this invention may be reacted with known chemical hardening agents for epoxy polyether resins to produce insoluble, infusible products which are particularly characterized by their toughness and flexibility. The presence of accelerators known to increase the speed of reaction or to lower the temperature of cure of epoxy polyether resins in admixture with a particular hardening agent in general has the same effect on the epoxy polyester resins of this invention. The cured resinous products are especially useful as casting resins for encasing articles, particularly because such cured products are sufficiently flexible to withstand the strains encountered as a result of temperature variations, which strains can become very severe in that hardened resinous compositions almost always have a thermal expansion several times as large as metals. These resinous products also possess satisfactory rigidity, heat and moisture resistance, and strength and are especially attractive because of their low cost. In addition, the uncured compositions have a low viscosity, providing for easy pouring of the liquid mass and thorough impregnation of the resin into the interstices of copper coils or other analogous articles to be treated. These liquid mixtures normally advance in viscosity very slowly at room temperature while curing rather quickly at moderately elevated temperatures. On the other hand, by proper selection of curing agents, the epoxy resins of this invention may be made to cure at room temperatures in a reasonably short period of time.

The first example deals with the preparation by well-known procedures of epoxidized polyesters such as soybean oil, which procedure forms no part of the present invention, but is included for convenience. Other suitable methods of epoxidizing unsaturated, long-chain, aliphatic compounds are found in U.S. Patents 2,458,484; 2,485,160; 2,556,145; and 2,569,502.

EXAMPLE I

One kilogram of soybean oil was epoxidized by reaction of 750 ml. of carbon tetrachloride and 77 grams of 90% formic acid with 680 grams of 35% hydrogen peroxide added dropwise over a period of 6½ hours with stirring while maintaining the temperature at about 25° C. by means of an ice bath, the reaction being mildly exothermic. The mixture was reacted for a further 48 hours and was warmed to about 40° C. during the last eight hours. It was then worked up to remove excess reagents and solvents. An 1100 gram product of epoxidized soybean oil was recovered which had an oxirane oxygen content of 5.8% as determined by the method of Swern et al. described in volume 19, page 414, of the Analytical Edition of Industrial and Engineering Chemistry. The expoxidized soybean oil had an epoxide equivalency of about 270 grams per gram molecular weight of oxirane oxygen or an average of about 3 epoxy groups per average molecular weight.

The following example deals with efforts made to cure the epoxidized soybean oil with a number of chemical hardening agents known to be useful in the curing of epoxy resins.

EXAMPLE II

Tetrapropenyl succinic anhydride is a liquid curing agent for epoxy resins which has been found convenient in preparing heat-curing, potting or encapsulating compositions. It is a reaction product of maleic anhydride and tetrapropylene in equal molar proportions. Tetrapropenyl succinic anhydride was mixed with the epoxidized soybean oil of the previous example in an amount stoichiometrically equivalent to the epoxy groups in the epoxidized oil, that is, 270 parts of the anhydride and 270 parts by weight of epoxidized oil. To this was added 5 parts of dimethyl benzylamine as a catalyst and heat was supplied with continued stirring to bring the components into solution. The mixture was then poured into a small aluminum dish and placed in an oven maintained at 120° C. The resin gelled after about 5–10 hours and heating was continued for a total of 20 hours. The casting on cooling to room temperature was flaccid and cheesy and could be easily torn.

The experiment was repeated using equivalent amounts of maleic anhydride both with and without the tertiary amine without obtaining a better casting.

Another curing agent was prepared by reacting alloocimene which has the formula

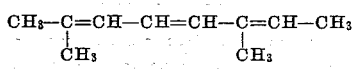

with equal molecular proportions of maleic anhydride by the Diels-Alder process. Mixtures of 45 parts of this adduct with 55 parts of the epoxidized soybean oil of Example I were prepared, a first mixture containing one part of the catalyst, tris-2,4,6(dimethylaminomethyl)phenol, and a second mixture including five parts thereof. A sample of the second mixture gelled after 2½ hours at 120° C. with severe bubbling and was held at 120° C. for about 16 hours. The casting was soft and rubbery at room temperature. A sample of the first mixture held for 30 hours at 120° C. was even weaker than the casting obtained with the second mixture.

A mixture of 88 parts of the epoxidized soybean oil and 12 parts of diethylene triamine was held at 120° C. for 54 hours. A soft, flexible, weak casting was obtained.

These and other experiments demonstrate that polyepoxidized polyesters such as epoxidized soybean oil cannot be cured to produce strong, tough products by methods normally employed with epoxy polyether resins.

The remainder of the examples deal with the preparation of the novel class of epoxy resins of this invention and with their application to useful purposes. In each of these examples, all parts are given by weight unless otherwise noted.

EXAMPLE III

A sample of 1350 grams or 5 epoxy equivalents of the epoxidized soybean oil of Example I was heated to 100° C. with 100 grams of resorcinol, or 1.82 hydroxy equivalents, and 15 grams of powdered potassium hydroxide was added with stirring. The oily mixture was heated for a further three hours at about 125° C. and cooled. The reaction product had a viscosity at 25° C. as measured on the Brookfield viscometer of 28 poises as compared to the viscosity of unsubstituted epoxidized soybean oil of less than 2 poises at the same temperature. A substantial darkening in color was also noted. The resorcinol-modified epoxidized soybean oil was assayed and found to contain approximately 4.3 percent oxirane oxygen, indicating that about 60 percent of the resorcinol hydroxyl groups had reacted with the epoxidized oil, assuming that both hydroxyls could react. Since the reaction of one hydroxy group renders the other much less reactive, it is apparent that substantially all of the resorcinol entered into reaction with the epoxidized soybean oil. The oxirane oxygen analysis was used to calculate that the reaction product contained roughly 2.4 epoxy groups and 0.7 resorcinoxy groups per average molecular weight. However, these values are mere estimates since no effort was made to obtain an accurate determination of the average molecular weight of either this reaction product or any phenol-modified epoxidized soybean oil obtained in the other examples used to illustrate the invention. For purposes of calculations, the average molecular weight of the epoxidized soybean oil obtained in Example I and used in this and other examples was assumed to be about 830.

Thirty-seven parts of the resorcinol-modified epoxidized soybean oil were mixed with 27 parts tetrapropenyl succinic anhydride and 0.3 parts dimethyl benzylamine, and the viscosity was measured at 25° C. over a period of time by means of a Brookfield viscometer. The results are tabulated below in Table I under the designation Sample #1. A freshly prepared sample held for four hours in an oven at 120° C. gelled in less than one hour and cured to a tough, flexible resinous solid which could not be broken with a hammer.

The resorcinol-modified epoxidized soybean oil was also cured by the reaction product of myrcene and maleic anhydride made by the Diels-Alder process. A mixture of 25 parts of the modified soybean oil, 16 parts of the anhydride adduct, and 0.15 parts dimethylbenzylamine was cured for four hours at 120° C. The casting was flexible and tough and could not be broken with a hammer but seemed somewhat weaker than the casting prepared using tetrapropenyl succinic anhydride. The viscosity of a sample of this mixture, referred to as Sample #2, measured at 25° C. over a period of time with a Brookfield viscometer is also noted in Table I.

Table I

| Time | Viscosity in poises | |
|---|---|---|
| | Sample #1 | Sample #2 |
| Fresh | 13 | 8 |
| 5 hours | 36 | 26 |
| 30 hours | 52 | 39 |
| 48 hours | 73 | 52 |
| 5 days | 87 | 69 |
| 9 days | 121 | 98 |

It should be noted that a composition having a viscosity of less than 50 poises pours very easily and readily saturates copper coils and similar articles to be potted, and compositions well over 100 poises still pour easily but may not thoroughly saturate minute crevices or finely woven fabrics. In each case after the viscosity advanced well beyond 50 poises, it was quickly brought below that value upon warming. It follows that the compositions of this invention have an excellent pot life.

EXAMPLE IV

A number of phenols were used to modify the epoxidized soybean oil of Example I, following the procedure outlined in Example III, and the compositions and reaction conditions for a few of these are listed below in Table IIA:

Table IIA

| | Sample #3 | Sample #4 | Sample #5 |
|---|---|---|---|
| Ingredients: | | | |
| Expoxidized soybean oil | 270 | 270 | 270 |
| Phenol | 47 | | |
| Resorcinol | | 22 | 55 |
| Potassium hydroxide | 1 | 1 | 1 |
| Reaction conditions: | | | |
| Time in hours | 9 | 2 | 1 |
| Temperature, ° C | 125 | 120 | 135 |
| Product analysis: | | | |
| Viscosity at 25° C. in poises | 47 | 36 | 148 |
| Oxirane-oxygen content, percent | 2.41 | 4.01 | 3.08 |
| Epoxy groups per Ave. Mol. Wgt. | 1.5 | 2.3 | 2.0 |
| Aryloxy groups per Ave. Mol. Wgt. | 1.6 | 0.7 | 1.1 |

As was pointed out above in connection with Example III, the numbers of epoxy and aryloxy groups in an average molecular weight of the reaction product are roughly calculated and serve only to point out in general the nature of the polyester resins of this invention.

These reaction products were cured for four hours at 120° C. with tetrapropenyl succinic anhydride (TPSA) and dimethyl benzylamine (DMBA) as catalyst in the proportions noted in Table IIB below. The cured castings in each case were tough, clear and bubble-free. The castings obtained from Sample 3 were flexible at room temperature and those obtained from samples 4 and 5 were more rigid but stoll slightly flexible at room temperature.

The castings were then held in an air-circulating oven for one week at 120° C. and their weight checked at the times noted in Table IIB as a measure of deterioration. The resistance of these cured compositions to heat deterioration is thought to be entirely satisfactory for most purposes.

Table IIB

|  | Sample #3 | Sample #4 | Sample #5 |
| --- | --- | --- | --- |
| Ingredients: |  |  |  |
| Modified soybean oil | 100 | 100 | 100 |
| TPSA | 41 | 68 | 52 |
| DMBA | 0.5 | 0.5 | 0.5 |
| Weight loss in percent after: |  |  |  |
| 4 hours | 1.3 | 1.0 | 1.3 |
| 24 hours | 2.5 | 1.2 | 2.2 |
| 1 week | 3.3 | 1.9 | 4.5 |

EXAMPLE V

A mixture of 135 grams or 0.5 epoxy equivalents of the epoxidized soybean oil of Example I, 30 grams or 0.263 hydroxy equivalents of 2,2-bis(4-hydroxyphenyl)propane known in commerce as bisphenol A, and one gram of powdered potassium hydroxide was heated slowly to about 125° C. with stirring and held at that temperature for three hours. The product was found to have a viscosity of 41 poises and an oxirane-oxygen content of 4.0 percent, from which it was calculated that the product contained roughly about 0.5 aryloxy and about 2.5 epoxy groups per average molecular weight, assuming this to be about 830.

A blend of equal parts by weight of this product and tetrapropenyl succinic anhydride was cured at 120° C. for 10 hours to obtain tough, flexible castings which were tested for electrical properties as shown in Table III below.

The fact that this product required ten hours at 120° C. to cure indicates that a lesser degree of phenol substitution might be undesirable by requiring an undue period of time before curing. For example, a sample of the epoxidized soybean oil of Example I modified with bisphenol A only to the extent that the viscosity was advanced to 9 poises (Brookfield at 25° C.) required twenty-one hours to cure at 120° C. in an equal parts by weight mixture with tetrapropenyl succinic anhydride.

Table III

|  | Room Temperature | | 90° C. | 105° C. |
| --- | --- | --- | --- | --- |
|  | 60 cycles | 1 kc. | 1 mc. | 1 kc. | 1 kc. |
| Dissipation Factor | .05 | .03 | .02 | .02 | .02 |
| Dielectric Constant | 3.1 | 2.9 | 2.7 | 4.4 | 4.3 |

The values listed for the cured castings obtained from the bisphenol-modified epoxidized soybean oil with tetrapropenyl succinic anhydride indicate that this composition is entirely satisfactory for electrical potting purposes insofar as its electrical properties are concerned.

The same thermosetting blend was found to have an initial viscosity (Brookfield) at 25° C. of 9 poises and a viscosity of 30 poises after forty-six hours at ordinary room temperatures, indicating good pot life.

EXAMPLE VI

Bisphenol A and the epoxidized soybean oil of Example I were mixed in the same proportions, that is, 135 grams of the epoxidized oil to 30 grams of bisphenol A, but here one milliliter of pyridine was used as the catalytic agent. After heating for two hours at 130° C., the Brookfield viscosity of the mixture at room temperature had advanced to 95 poises, and the oxirane oxygen content was 3.7%, indicating that almost all of the bisphenol had reacted assuming only one hydroxyl radical in each molecule reacted.

Equal parts by weight of this reaction product and tetrapropenyl succinic anhydride cured in seven hours at 120° C. to a tough, flexible casting at least as strong as any obtained in Example V. Another sample of the thermosetting mixture was found to have an initial viscosity of 16 poises and viscosities of 70 and 139 poises after 30 and 71 hours at room temperature.

EXAMPLE VII

A mixture of 135 grams of the epoxidized soybean oil of Example I, 40 grams of bisphenol A, and 2 ml. of dimethyl benzylamine were reacted for two hours at 130° C. followed by three hours at 150° C. The product had a viscosity of 40 poises at room temperature and an oxirane-oxygen content of 3.9%. Twelve grams of this product were cured with 11 grams of tetrapropenyl succinic anhydride and 0.1 gram of dimethyl benzylamine for thirteen hours at 120° C. The cured casting was tough and flexible.

Epoxidized soybean oil and bisphenol in the same proportions were reacted with 2 ml. of pyridine for two hours at 150° C. The reaction product was very viscous and would not pour at room temperature. Its oxirane-oxygen content was 1.9%, indicating that over 80 percent of the total hydroxyl groups in the bisphenol had reacted with the epoxidized oil. Rough calculations based on the oxirane-oxygen content indicated that the reaction product contained about 1.2 epoxy groups and 1.8 aryloxy groups per average molecular weight.

This product was mixed with equal parts by weight of tetrapropenyl succinic anhydride and cured in seven hours at 120° C. to a tough, flexible casting.

EXAMPLE VIII

A mixture of 135 parts of the epoxidized soybean oil of Example I, 30 parts of bisphenol A, and 2 parts of pyridine was reacted according to the procedure outlined in Example III. The product had a viscosity of about 110 poises and an oxirane-oxygen content of 3.5 percent. A mixture of four parts of this modified oil and one part of chloromaleic anhydride had an initial viscosity of 21 poises but gelled in 5½ hours at room temperature and was well cured after several days. The casting was flexible and tough and could not be broken with a hammer.

EXAMPLE IX

Ten parts of the bisphenol-modified epoxidized soybean oil of Example V were mixed with 1 part of toluene diisocyante. The mixture gelled almost immediately.

EXAMPLE X

Thirty parts of bisphenol A and 135 parts of the epoxidized soybean oil of Example I were mixed until well dispersed and then heated to 110°–120° C. Two parts of powdered potassium hydroxide were added and the temperature maintained for about three hours, after which the potassium hydroxide was filtered out. The modified oil obtained had a viscosity of about 35 poises at 25° C.

Two compositions, labelled for convenience as Compositions A and B, were prepared by mixing the ingredients listed below in Table IV thoroughly at room temperatures. The modified epoxidized soybean oil used in Composition A was prepared as outlined above. It should be noted that Compositions A and B are each indefinitely stable at room temperatures. To realize this stability, the potassium hydroxide was filtered out of the reaction product of the bisphenol and epoxidized soybean oil. When this procedure was omitted, a gradual increase in viscosity was experienced in Composition A.

Table IV

| Composition A: | Parts by weight |
|---|---|
| Modified soybean oil | 73.6 |
| Cardolite 6885 | 21.1 |
| Bisphenol-epichlorhydrin epoxy resin | 4.3 |
| Iron oxide | 1.0 |
| Composition B: | |
| Tetrapropenyl succinic anhydride | 98.4 |
| Tris-dimethylaminomethyl phenol | 0.8 |
| Pyridine | 0.6 |
| Pigment | 0.2 |

Cardolite 6885 is a glycidyl ether of the derivative of cashew nut shell oil, m-pentadecylphenol, containing on the average about 40 percent each of mono- and tri-unsaturated chains and about 20 percent di-unsaturated chains. The bisphenol-epichlorhydrin type epoxy resin used had an epoxide equivalency of about 200 and a melting point of about 10° C. as determined by the Durran's Mercury Method. Such a resin is marketed by the Union Carbide and Carbon Corporation under the designation ERL–2774, which name supersedes the designation BR–18774.

Mixtures of equal parts of Compositions A and B have been used to pot transformers of varying sizes with curing at 120° C. for 4 hours. These castings exceed the requirements set forth in the military specification of the U.S. Government MIL–T–27 as amended in Amendment–3 dated May 16, 1951 for Grade 1, Class A use. Tests under the specification include cycling a potted transformer over the temperature range of 65° C. to −10° C., much of the time at a relative humidity of 90 to 95 percent, for ten periods of 24 hours. At times during the cycling, the samples are vibrated over the range of 10 to 55 cycles per second in each minute at an amplitude of 0.03 inch. After this moisture-resistance test, the insulation resistance must be at least 1000 megohms. The tests also require immersion of samples for five cycles in saturated salt water at a number of temperatures including 15 minutes in each cycle at about 85° C. and 15 minutes at −55° C.

In spite of the fact that polyepoxidized polyesters of polyhydric aliphatic alcohols and long-chain aliphatic monocarboxylic acids such as epoxidized soybean oil either cannot be cured to an insoluble, infusible state or, if curable, will not yield useful cured products, it has been demonstrated that these polyesters can be modified with phenolic compounds to obtain epoxy polyester resins which cure at moderately elevated temperatures in reasonably short periods of time to tough, flexible resinous products having considerable commercial value. The transition between an unmodified polyepoxidized polyester and the curable phenol-substituted epoxy resin obtainable therefrom is marked by a significant increase in viscosity accompanied by a definite darkening in color, each of which physical changes gives a fairly close indication of the degree of modification of the polyester. The novel phenol-modified epoxy polyester resins can then be mixed with a variey of curing agents which may be selected to significantly reduce the viscosity so that the curable compositions easily saturate articles of intricate construction or fill complex moldings while still at room temperature. The compositions retain this low viscosity for several days at room temperature although they can be cured in a relatively short time at moderately elevated temperatures.

What is claimed is as follows:

1. The method of making an epoxy polyester resin which can be cured in admixture with a polyfunctional chemical hardening agent for epoxy polyether resin to a tough resinous state, said method consisting essentially of the steps of (1) blending in an alkaline medium (A) a polyester of polyhydric aliphatic alcohol and long-chain fatty acid having, per average molecular weight, at least about 1.5 oxirane groups directly and laterally attached to carbon atoms of the fatty acid radicals of the polyester at least eight carbon atoms removed from the acyl carbon atoms with (B) an aromatic compound having at least one phenolic hydroxyl radical and free from other functional substituents, (2) heating the blend at a temperature and for a time to convert at least about 0.5 oxirane groups per average molecular weight of the polyester to aryloxy and hydroxyl radicals directly and laterally attached to adjacent carbon atoms of the fatty acid radicals of the polyester while leaving at least about one oxirane group per average molecular weight and not more than about one oxirane group per ester linkage, and (3) cooling the converted blend and thereby obtaining said epoxy polyester resin.

2. The method of making an epoxy polyester resin which can be cured in admixture with a polyfunctional chemical hardening agent for epoxy polyether resin to a tough resinous state, said method consisting essentially of the steps of (1) blending in an alkaline medium (A) a modified natural triglyceride, said modificaion being per average molecular weight, at least about 1.5 oxirane groups directly and laterally attached to carbon atoms of the fatty acid radicals of the modified triglyceride at least eight carbon atoms removed from the acyl carbon atoms, with (B) an aromatic compound having at least one phenolic hydroxyl radical and free from other functional substituents, (2) heating the blend at a temperature and for a time to convert at least about 0.5 oxirane groups per average molecular weight of the modified triglyceride to aryloxy and hydroxyl radicals directly and laterally attached to adjacent carbon atoms of the fatty acid radicals of the modified triglyceride while leaving at least about one oxirane group per average molecular weight and not more than about one oxirane group per ester linkage, and (3) cooling the converted blend and thereby obtaining said epoxy polyester resin.

3. The method of making an epoxy polyester resin which can be cured in admixture with a polyfunctional chemical hardening agent for epoxy polyether resin to a tough resinous state, said method consisting essentially of the steps of (1) blending in an alkaline medium (A) a modified soybean oil, said modification being per average molecular weight, at least about 1.5 oxirane groups directly and laterally attached to carbon atoms of the fatty acid radicals of the modified soybean oil at least eight carbon atoms removed from the acyl carbon atoms, with (B) an aromatic compound having at least one phenolic hydroxyl radical and free from other functional substituents, (2) heating the blend at a temperature and for a time to convert at least about 0.5 oxirane groups per average molecular weight of the modified soybean oil to aryloxy and hydroxyl radicals directly and laterally attached to adjacent carbon atoms of the fatty acid radicals of the modified soybean oil while leaving at least about one oxirane group per average molecular weight and not more than about one oxirane group per ester linkage, and (3) cooling the converted blend and thereby obtaining said epoxy polyester resin.

4. The epoxy polyester resin produced by the method of claim 1.

5. The epoxy polyester resin produced by the method of claim 2.

6. The epoxy polyester resin produced by the method of claim 3.

7. A composition of matter which is curable to a hard, tough resinous state, said composition comprising a blend of (a) the epoxy polyester resin produced by the method of claim 1 and (b) a polyfunctional chemical hardening agent for epoxy polyether resin.

8. The hard, tough, cured resinous product of the composition of matter defined in claim 7.

9. A composition of matter capable of curing, when heated in admixture with a polyfunctional chemical hardening agent for epoxy polyether resin, to a tough, flexible resinous product, and comprising a blend of (a)

the epoxy polyester resin produced by the method of claim 1 and (b) an epoxy polyether resin having an average of more than one 1,2-epoxy group per average molecular weight.

References Cited in the file of this patent

UNITED STATES PATENTS

| | | |
|---|---|---|
| 2,458,484 | Terry | Jan. 4, 1949 |
| 2,512,997 | Bixler | June 27, 1950 |
| 2,542,664 | Greenlee | Feb. 20, 1951 |
| 2,615,007 | Greenlee | Oct. 21, 1952 |
| 2,659,696 | Neff | Nov. 17, 1953 |
| 2,659,710 | Martin | Nov. 17, 1953 |
| 2,665,266 | Wasserman | Jan. 5, 1954 |
| 2,668,805 | Greenlee | Feb. 9, 1954 |
| 2,682,514 | Newey | June 29, 1954 |
| 2,731,444 | Greenlee | Jan. 17, 1956 |

FOREIGN PATENTS

| | | |
|---|---|---|
| 139,374 | Australia | Nov. 13, 1950 |

OTHER REFERENCES

Schildknecht: "Polymer Processes" ("High Polymers" vol. X), Interscience Pub. Inc., N.Y. 1956, pages 436–7.